US010417697B2

(12) United States Patent
Hudson et al.

(10) Patent No.: US 10,417,697 B2
(45) Date of Patent: Sep. 17, 2019

(54) SYSTEM AND METHOD FOR STRUCTURING AN ONLINE AUCTION WHEN RESERVE PRICE IS NOT MET

(71) Applicant: Ten-X, LLC, Irvine, CA (US)

(72) Inventors: James Hudson, San Jose, CA (US); Nathaniel Dever, Rancho Santa Margarita, CA (US)

(73) Assignee: Auction.com, LLC, Irvine, CA (US)

( * ) Notice: Subject to any disclaimer, the term of this patent is extended or adjusted under 35 U.S.C. 154(b) by 905 days.

(21) Appl. No.: 14/732,595

(22) Filed: Jun. 5, 2015

(65) Prior Publication Data

US 2015/0287132 A1 Oct. 8, 2015

Related U.S. Application Data

(63) Continuation-in-part of application No. 13/717,656, filed on Dec. 17, 2012, now Pat. No. 9,947,041.

(60) Provisional application No. 62/230,315, filed on Jun. 1, 2015.

(51) Int. Cl.
*G06Q 30/00* (2012.01)
*G06F 17/30* (2006.01)
*G06Q 30/08* (2012.01)

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS 5,857,174 A 1/1999 Dugan
6,058,379 A 5/2000 Odom et al.
6,684,196 B1 1/2004 Mini
6,813,612 B1 * 11/2004 Rabenold ............... G06Q 40/04 705/1.1

(Continued)

FOREIGN PATENT DOCUMENTS

AU 2009100313 A4 5/2009
WO WO 2012/002229 A1 1/2012
WO WO 2012/002229 5/2012

OTHER PUBLICATIONS

US patent issued on Nov. 9 for "method and program product for conducting an electronic auction including the automatic extension of auction end time" (florida inventors). (Nov. 10, 2010). US Fed News Service, Including US State News Retrieved from https://search.proquest.com/docview/763121178?accountid=14753.*

(Continued)

*Primary Examiner* — Kathleen Palavecino
(74) *Attorney, Agent, or Firm* — Fish IP Law, LLP

(57) ABSTRACT

A system and method for structuring an online auction when a reserve price is not met are described. In an online auction, bidding activity is analyzed over a duration to determine whether there are multiple active bidders for the auction and whether the reserve price for the auction is met after a designated period of time. In response to making that determination, the bidder interface for a sole active bidder on the auction can be automatically updated to include a notification that the bid has not met the reserve price and an option to place a new bid on the item so that the auction is successful and does not end with no bids meeting the reserve.

10 Claims, 8 Drawing Sheets

(56) References Cited

U.S. PATENT DOCUMENTS 6,947,906 B1 9/2005 Underwood et al.
6,976,005 B1 12/2005 Bansal et al.
7,213,000 B2 5/2007 Gutierrez et al.
7,225,151 B1 5/2007 Konia
7,296,033 B1 11/2007 Lynch
7,389,294 B2 6/2008 Kotas
7,472,076 B2 12/2008 Garg et al.
7,472,077 B2 12/2008 Roseman
7,493,274 B2 2/2009 Bezos
7,493,280 B2 2/2009 Guler
7,497,369 B2 3/2009 Dalzell
7,555,445 B2 6/2009 Moya
7,617,145 B1 * 11/2009 Peterson ................ G06Q 30/08 705/35
7,752,119 B2 7/2010 Ghani
7,865,420 B1 1/2011 Daman et al.
7,970,674 B2 6/2011 Cheng et al.
8,103,540 B2 1/2012 Gross
8,108,264 B1 1/2012 Davis
8,234,180 B2 7/2012 Danzan
8,386,330 B1 2/2013 Kulavade et al.
8,560,479 B2 10/2013 Bosworth
8,781,912 B2 7/2014 Solari
2002/0087389 A1 7/2002 Sklarz et al.
2002/0087456 A1 * 7/2002 Abeshouse ............ G06Q 30/08 705/37
2002/0099643 A1 7/2002 Abeshouse et al.
2002/0178069 A1 11/2002 Walker
2003/0023538 A1 1/2003 Das et al.
2003/0229552 A1 12/2003 Lebaric et al.
2004/0049440 A1 3/2004 Shinoda et al.
2004/0128224 A1 7/2004 Dabney et al.
2005/0049960 A1 3/2005 Yeager
2005/0108125 A1 5/2005 Goodwin et al.
2005/0154657 A1 7/2005 Kim et al.
2005/0197950 A1 9/2005 Moya et al.
2005/0240511 A1 10/2005 Chadwick
2006/0136320 A1 6/2006 Saberi et al.
2006/0218070 A1 9/2006 Lange
2007/0106593 A1 5/2007 Lin
2007/0106596 A1 5/2007 Bayyapu et al.
2007/0156758 A1 7/2007 Adiga
2007/0203823 A1 8/2007 Whelchel et al.
2007/0276745 A1 11/2007 Harinarayan et al.
2007/0299766 A1 12/2007 Bril
2008/0046353 A1 2/2008 Poltorak et al.
2008/0071634 A1 3/2008 Rampell et al.
2008/0103883 A1 5/2008 Szybalski
2008/0183596 A1 7/2008 Nash et al.
2008/0235113 A1 9/2008 Rabenold et al.
2008/0235125 A1 9/2008 Danzan
2008/0262943 A1 10/2008 Mullendore
2008/0294543 A1 11/2008 Shebby
2008/0301064 A1 12/2008 Burns
2009/0030833 A1 1/2009 Leung
2009/0112726 A1 4/2009 Miller et al.
2010/0057586 A1 3/2010 Chow
2010/0131426 A1 5/2010 Kroutik
2011/0173086 A1 7/2011 Berkowitz
2012/0002229 A1 1/2012 Tran
2012/0084169 A1 * 4/2012 Adair ..................... G06Q 30/08 705/26.3
2012/0136746 A1 5/2012 Lange
2012/0239582 A1 9/2012 Solari et al.
2012/0246024 A1 9/2012 Thomas et al.
2012/0290485 A1 11/2012 Ozonat
2013/0103532 A1 4/2013 Emura
2013/0103592 A1 4/2013 Shenk
2013/0218708 A1 * 8/2013 Finkelstein ............ G06Q 30/08 705/26.3
2014/0236751 A1 8/2014 Bloomfield
2014/0289065 A1 9/2014 Gladis et al.
2016/0071178 A1 3/2016 Perriello

OTHER PUBLICATIONS

Extended European Search Report dated Jul. 13, 2016, Application No. EP 14778060.5.

Extended European Search Report dated Jul. 27, 2016, Application No. EP 14769795.7.

Rischpater, R. (2004). Ebay Application Development. Apress. 321 pages.

International Search Report and Written Opinion dated Aug. 31, 2016, PCT Application No. PCT/US2016/033802, 9 pages.

International Search Report and Written Opinion dated Jun. 25, 2014, Application No. PCT/US2014/021733, 11 Pages.

International Search Report and Written Opinion dated Jul. 15, 2014, Application No. PCT/US2014/026859, 9 Pages.

International Search Report and Written Opinion dated Jun. 3, 2014, Application No. PCT/US2014/019341, 11 Pages.

Anwar et al. "Bidding behavior in competing auctions: Evidence from eBay", European Economic Review, 307-322 (2006).

* cited by examiner

Option 2: Best Offer

Option 3: Reveal Reserve

SYSTEM AND METHOD FOR STRUCTURING AN ONLINE AUCTION WHEN RESERVE PRICE IS NOT MET

RELATED APPLICATIONS

This application claims the benefit of priority to U.S. Provisional Patent Application Ser. No. 62/230,315, entitled, "System and method for structuring an online auction when reserve price is not met," filed Jun. 1, 2015; the aforementioned priority application being hereby incorporated by reference in its entirety.

This application is also a Continuation-in-part of U.S. patent application Ser. No. 13/717,656, entitled "DYNAMICALLY DETERMINING BID INCREMENTS FOR ONLINE AUCTIONS", filed Dec. 17, 2012; all of the aforementioned priority applications being hereby incorporated by reference in their respective entirety.

TECHNICAL FIELD

Examples described herein relate to online auctions, and more specifically, to a system and method for structuring an online auction when a reserve price is not met.

BACKGROUND

Numerous online auction forums exist that enable consumers and sellers to transact for various kinds of items, such as collectibles, electronics and other goods or services.

DETAILED DESCRIPTION

Figure 1:
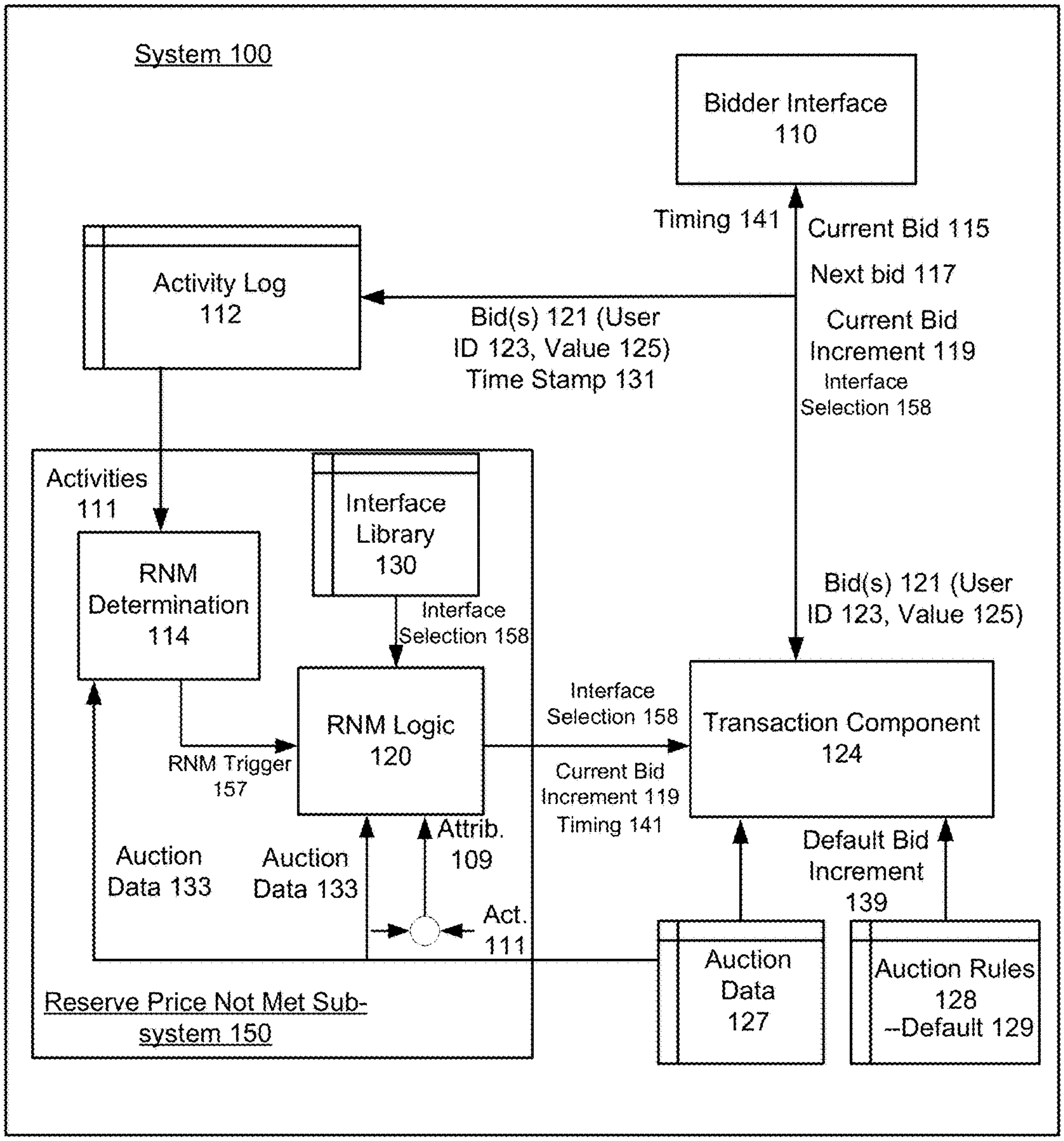
FIG. 1 illustrates an example system for implementing dynamic restructuring when a reserve price is not met in an online auction.

Examples described herein provide for online auction forums that update bidder interfaces when auctions reach or are near to reaching their ending times without the reserve price being met. By dynamically providing information and updated interfaces to a bidder, the auction can be implemented in a manner that optimizes bidding in view of specific auction activity. Among other benefits, the information and new interfaces can result in successful auctions rather than auctions that end without reaching their reserve prices in situations where a bidder may have been willing to bid more.

In an online auction, bidding activity is analyzed over a duration to determine whether there are multiple bidders for the auction and whether the reserve price for the auction is met after a designated period of time. In response to making that determination, the bidder interface for a bidder who has placed a bid on the item being auctioned can be automatically updated to include a notification that the bid has not met the reserve price and an option to place a new bid on the item. In one aspect, the designated period of time coincides with the ending time for the auction.

In some aspects, the bidding activity is also analyzed to determine whether the bidder is the only bidder who has placed a bid on the item in a certain period of time, such as the last day, to determine activity on the auction. If so, the bidder interfaces can be updated to prompt the sole bidder to increase his or her bid to meet the reserve price.

In an auction situation with only a single active bidder, maintaining bidder engagement can be challenging. If the single bidder does not continue bidding, the seller's reserve price will not be met and the item will not sell. In the offline world, auctioneers employ a technique called "seller bidding" where they place bids on behalf of the seller until the reserve is met. Although this is a legal and ethical technique, customer expectations in an online environment make using seller bidding problematic. In addition, there is a disconnect between buyers and sellers inherent in an online environment due to a lack of communication. A system to restructure the online auction when the reserve price is not met can help bridge this disconnect by providing more information to the buyer when the auction would otherwise end unsuccessfully.

Examples described herein encourage single bidder activity in online environments without the use of seller bidding. This solution provides the auctioneer with a mechanism for communicating to the single bidder that the current bid amount will not be accepted and therefore the item will not sell. It also gives the auctioneer the ability to extend the ending time of the auction to provide additional opportunities to receive a higher bid.

In some aspects, there can be multiple bidder interfaces that can be used to encourage the bidder to make a new bid to reach the reserve price of the auction. The seller can choose between these options, either when the auction is created or during the auction, or the auction forum itself can select the most appropriate interface and information to display to the bidder based on factors such as activity on the auction and known information about the bidder and/or the item being auctioned.

In one aspect, the bid increment for the auction can also be changed such that the current bid plus the new bid increment meets or exceeds the reserve price. Thus, if the bidder chooses to make a new bid, the new bid will result in a successful auction.

In another aspect, a message can be transmitted to the bidder who has placed a bid on the item encouraging the bidder to place a new bid, the contents of the message being based on at least information including the bidder's profile, recent auctions on the forum, and attributes of the item. The message can also include a suggested new bid based on the reserve price. For example, the suggested new bid can be the reserve price itself.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Auction Architecture

FIG. 1 illustrates an example system for implementing dynamic restructuring when a reserve price is not met in an online auction. A system 100 such as described by an example of FIG. 1 can be implemented in a variety of computing environments. For example, system 100 can be implemented as part of an online market environment, such as an online auction. Still further, the system 100 can be implemented as a network service that augments or facilitates an online market place. Accordingly, system 100 can be implemented as a network service, through a combination of servers or other network enabled computing devices. In variations, system 100 can be implemented on other computing platforms, including stand-alone systems. Thus, in some variations, system 100 can operate on a product or service that is maintained on a single computing device or storage device.

In an example of FIG. 1, system 100 implements an auction forum from which multiple auctions can be conducted. In one implementation, the system 100 includes a bidder interface 110, an activity log 112, and a transaction component 124. The system 100 can also include a reserve price not met sub-system 150 for pricing bids when the auction is in progress. When an online auction is initiated, persons (e.g., bidders) can interact with the bidder interface 110 to determine whether to place a bid, and to submit the bid for the item being auctioned. The transaction component 124 can implement auction rules 128 and logic for receiving bids and advancing the auction to completion. As described by various examples, the reserve price not met sub-system 150 can adjust bid increments, adjust the ending time of auctions, and select updated bidder interfaces to be displayed to bidders based on conditions, such as determined from auction activity.

In one implementation, the bidder interface 110 can be implemented as part of a web page in which the current bid amount is displayed to a population of potential bidders. In variations, the bidder interface 110 can be implemented as part of an application page or presentation which displays information and provides functionality corresponding to the bidder interface 110. Various kinds of information and functionality can be displayed through the bidder interface 110, including the current bid 115 (the highest placed bid), as well as the bid increment 119 and/or next bid 117 (e.g., the current bid 115 in addition to the bid increment 119). Other information that can be displayed through the bidder interface 110 include timing information 141 which can include, for example, the time left for a bidder to submit a bid and/or for the time left for the auction to be over. When the auction is over, the bidder with the current bid 115 can be assumed to be the winner of the auction. Prior to the auction being over, the bid increment 119 can identify the next bid amount by which a participant can become the highest bidder. Depending on the auction rules, the bidder can place an amount that is higher than what is suggested by the bid increment 119, but not lower (unless auction rules permit otherwise). The bidder interface 110 can display various other kinds of information as well, such as information about the asset being auctioned (e.g., description, images, etc.), parameters such as whether a reserve price has been placed and/or whether the reserve price has been met, information about the seller, or a full or partial bid history (e.g., the bidder or bidder identity and a corresponding bid amount, the number of bids received in a given duration etc.).

The transaction component 124 can conduct the auction in accordance with the auction rules 128, which can include, among other logic, default rules 129. The default rules 129 can provide values for the initial bid and/or the default bid increment 139. The auction rules 128 can also control implementation of various facets of how the auction is conducted, such as for example, the type of auction being conducted (e.g., English auction), and the timing aspects of the auction (e.g., when bids can be received, when the auction is over, etc.). For example, the auction rules 128 can include timing rules which can determine the duration of time until completion of the auction, and/or the time for which a bidder can submit a bid. As an example, auction rules 128 can include timing logic which extends the completion time of the auction if a bid is submitted within a given duration from the time when the auction is completed.

With reference to the example of FIG. 1, the transaction component 124 can also maintain or access information for one or more auctions at any one time. An auction data store 127, for example, can maintain information about live or ongoing auctions. In some cases, the duration in which the auction is active can be adjusted (e.g., extended or reduced) based on auction rules 128. For example, a given auction can be conducted so that if a bid is received in a set number of minutes before the auction expiration, the auction is extended by another duration of time (e.g., one minute extension).

In one implementation, for a given auction, the bidder interface 110 enables the bidders to view the current bid 115, the next bid 117 and the bid increment 119. Multiple bidders can participate in the given auction. An auction activity log 112 can record auction activity for individual auctions. In particular, the recorded auction activity can include a history of each bid 121 that is received in the particular auction. Each bid 121 can include or be associated with a bidder identifier 123 (e.g., user name) and value 125, and the most recent bid can also correspond to the current bid 115. The activity log 112 may also record a time stamp 131 for when each bid is received. In this way, the activity log 112 can be used to identify information such as (i) number of bidders, (ii) number of bids, and/or (iii) information relating to a timing of when bids are received. As described with other examples, the timing information can be used to determine a bid velocity.

Reserve Price not Met Sub-System

According to some embodiments, the system 100 includes programmatic components to implement one or more operations for enticing bidding activity when a reserve price of an auction is not met. In particular, system 100 can include programmatic components for increasing bidding activity when only one (or a limited number of bidders) have participated in the auction, with the reserve price being unmet and a limited amount of time left in the auction. When, for example, there is only a single bidder in an auction, no motivation exists to trigger the bidder to raise the bid and the auction reserve is not met.

In an example of FIG. 1, system 100 includes reserve price not met ("RNM") functionality for (i) generating a reserve not met interface, (ii) extending the ending time of an auction, and/or (iii) changing the bid increment in connection with an unmet reserve price. In one embodiment, system 100 can operate in a default mode in which the bid increment is predetermined and based on a default value, but can be switched to a reserve price mode that calculates the bid increment to be the reserve price. The reserve price functionality and mode can be selected when a determination is made that the auction will end without the reserve price being met. Thus, system 100 can be multimodal, and the reserve price mode can be selected as a mechanism to move the auction to completion when the auction otherwise would not complete because of lack of bidding activity. In this regard, a technical effect is achieved in that system 100 is able to successfully complete more auctions, and thus yield better efficiency for a network computer system which hosts or conducts online auctions with reserve pricing. For example, a solution provided increases the likelihood that a single bidder auction situation will meet the reserve and result in a sale, without need of seller bidding, such as practiced by under more traditional approaches.

With reference to system 100, the transaction component 124 can incorporate, or be used with, RNM sub-system 150. In one embodiment, the sub-system 150 includes an RNM determination 114, RNM logic 120, and an interface library 130. The RNM determination 114 can optionally operate to monitor the activity log 112 for activities 111. The RNM determination 114 can be programmed to detect an event or condition to trigger RNM functionality and/or mode. By way of example, RNM determination 114 can monitor for auction activities, events and conditions corresponding to one or more of (i) the number of bidders being less than a threshold number (e.g., less then 3, or only 1), (ii) the number of bids being less than a threshold number, (iii) a timing event relating to the default end of the auction, such as five minutes before the auction is to close (unless, for example, the auction ending point is to be extended), (iv) a parametric determination of the auction activity being less than a threshold level. In some variations, the RNM determination 114 can determine a likelihood that the reserve price of the auction will be met, given a difference between a current bid price and the reserve price, as well as the time remaining in the auction.

In an embodiment, the RNM logic 120 performs operations for completing the auction when the reserve price is not met and the auction is likely to fail. As described in greater detail, the RNM logic 120 can provide information and/or an updated interface to a bidder, extend the ending time of the auction, and/or after the bid increment. The operations of the RNM logic 120 can be based on the attributes of the auction, which can include the profile or characteristics of the bidder, preferences of the seller, recent auction prices and/or other considerations. The attributes 109 of the auction can include or be determined from the auction data 133 and/or auction activities 111. Moreover, the operations performed can be also be configured to reflect attributes 109.

In one implementation, the RNM logic 120 can respond to a RNM trigger 157 generated from the RNM determination 114. The RNM logic 120 can operate to make an interface selection 158 between a number of interface choices in an interface library 130 when the RNM functionality or mode is present. The interfaces can optionally structure a message for bidding activity to reflect the failing state of the auction, to prompt the bidder to make a best offer, to prompt a next bid to meet reserve or to reveal a reserve. Examples of interfaces which can be generated or rendered with interface library 130 are provided with FIG. 3A through FIG. 3C and FIG. 4A through FIG. 4C.

The auction attributes 109, which select and/or configure the operations performed by the RNM logic 120, can include, for example, (i) a number of bids received for the auction from the beginning of the auction start time, (ii) a number of bidders, and/or (iii) a duration remaining in the auction (e.g., two minutes, by default, etc.). The auction attributes 109 can also include bidder information, such as the bidder's previous history. For example, RNM logic 120 may determine that the bidder is likely to place a higher bid only if he or she knows the reserve price, and thus the interface selection 158 can be one that displays the reserve price to the bidder.

Figure 2A:
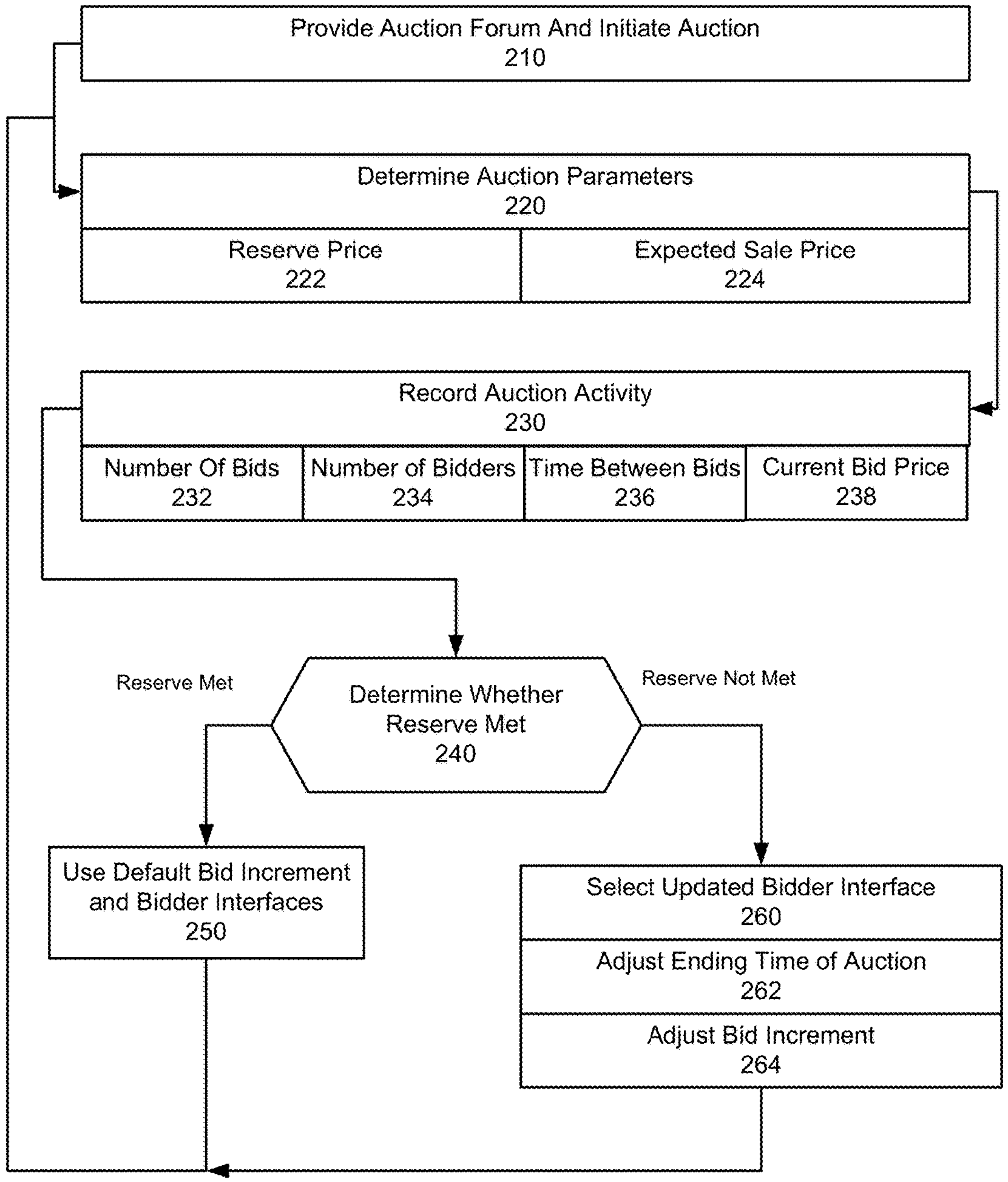
FIG. 2A illustrates an example method for conducting an online auction in a manner that utilizes dynamic restructuring when a reserve price is not met.

In addition to using activities 111 as part of the auction attributes, the RNM logic 120 can use auction data 133. The auction data 133 can include, for example, the reserve price, the estimate value of the item being auctioned, the type of property being sold in the auction, as well as the time left in the auction and/or other parameters, such as whether time extensions for the auction or in force. FIG. 2A, as described below, illustrates an example method that can be implemented in part by the reserve price not met sub-system 150 in determining the current bid increment 119, timing 141, and interface selection 158.

Each of the RNM determination 114 and the RNM logic 120 can be configured to monitor for activities 111 based on implementation and design parameters for system 100. For example, as an alternative or variation, RNM determination 114 can be configured to utilize and respond to other kinds of activities 111, such as number of page views (e.g., shown amount of interest by potential bidders), bidding activity of similar products in other auctions, a type of product being auctioned (e.g., real property asset versus electable), or a subtype of product being auctioned (e.g., condominium versus commercial property).

As output, the RNM logic 120 can signal the current bid increment 119 to the transaction component 124. The current bid increment 119 can be the default bid increment 139 (e.g., if there are multiple active bidders on the auction or if another bid at the default bid increment 139 will meet the reserve price), or an optimal or dynamic bid increment as determined from auction activities 111 and/or auction data 133. In addition, the RNM logic 120 can signal a new timing 141 to transaction component 124 to extend the auction in order to give the bidder more time to consider placing a higher bid that meets the reserve price. Furthermore, the interface selection 158 chosen by the RNM logic 120 can be sent to the transaction component 124 to be shown on the bidder interface 110.

In other aspects, RNM logic 120 can contact the bidder in other out-of-band methods in addition to or in lieu of the interface selection 158. For example, an e-mail can be sent or an automated phone call placed to the bidder with information displayed on the updated interface such as the new ending time of the auction and a message that the bidder's current bid does not meet the reserve but a higher bid would.

Methodology

FIG. 2A illustrates an example method for conducting an online auction in a manner that utilizes dynamic restructuring when a reserve price is not met. A method such as described by FIG. 2A can be implemented using, for example, a system 100 such as described by FIG. 1. Accordingly, reference may be made to elements of FIG. 1 for purpose of illustrating suitable components for performing a step or sub step being described.

In FIG. 2A, an auction forum is provided, and an auction is initiated (210). In one implementation, an online auction provider can trigger the start of an auction for a particular item at a given point in time. The length of the auction can be determined by various parameters, such as a default or set time from when the auction is initiated (e.g., number of days). Optionally, in some implementations, the length of the auction can be varied or algorithmically determined from the time the auction is initiated. For example, in one implementation, an auction can be extended when a bid is received in a final predetermined duration of time before the auction is to end.

Once the auction is started, a determination can be made to determine or identify a designated set of auction parameters (220). For a given auction, the auction parameters can include, for example, the reserve price (222), or an expected sale price (224) (or alternatively the value of the item being auctioned). Other parameters of the auction can include, for example, the number of people who view the auction page, the title property being sold, the expected duration of the auction, and/or the preference settings of the seller.

Additionally, once the auction is initiated, certain types of auction activity can be monitored and recorded (230). In one implementation, the type of auction activity that can be recorded can include those which are subsequently used to determine optimal or alternative bid increments based on ongoing auction activity and/or other parameters. For example, RNM determination 114 and/or RNM logic 120 can operate to determine auction activity that corresponds to one or more of the following: (i) the number of bids received for the auction since it was initiated (232), (ii) the number of bidders that are participating (e.g., who have placed bids) in the auction (234), (iii) the time between recent or most recent bids (e.g., average time between the five most recent bids) (236), and/or the current bid price (238).

In some embodiments, a programmatic determination is made for whether the reserve price has been met (240) when the auction has reached a designed time, such as the end of the auction or an hour before the end of the auction. In one implementation, the determination can be made as to whether system 100 should (i) continue the auction with the default bid increment and bidder interfaces, or (ii) update aspects of the auction based on activities and parameters of the auction. In one implementation, the number of active bidders on the auction is determined when the reserve price is not met. An active bidder is anyone who has placed a bid within a recent period of time, which can be adjusted based on the total length of the auction. For example, an active bidder on a month-long auction may be anyone who has placed a bid in the last week. When there is only one active bidder, the RNM logic 120 can adjust auction parameters and inform the bidder that his or her current bid does not meet the reserve.

If there are multiple or no active bidders, the default auction parameters such as the default bid increment may be used (250). In one implementation, the default bid increment is a static value that is applied to the auction. The static value can be based on, for example, the reserve price, the expected value of the item being auctioned, or prior auctions. In variations, the default bid increment can be determined by formula, independent of the ongoing auction activity or parameters. For example, the default bid increment can decrease as a function of time as the auction nears its end.

If a determination is made that there is only one active bidder, then the bidder interface for that active bidder can be updated (260). More specifically, in some aspects, the selected interface can include a notification to the bidder that his or her bid is currently below the seller's reserve price and that the bidder must bid higher to win the auction. In other aspects, the reserve price can be shown to the bidder along with an interface for the bidder to meet the reserve price. Alternatively, the bidder can be asked to make his or her best offer, which can be accepted if it is above the reserve price. In some aspects, the bidder's best offer can be sent to the seller, who may choose to accept the offer even if it is below the reserve price.

Furthermore, in order to give the bidder time to consider the new information, the ending time of the auction can be adjusted (262). For example, an extra day may be appended to the length of the auction so that it does not end without meeting the reserve price. In addition, the bid increment can be adjusted such that the bidder's next valid bid meets the reserve price and results in a successful auction (264).

Figure 2B:
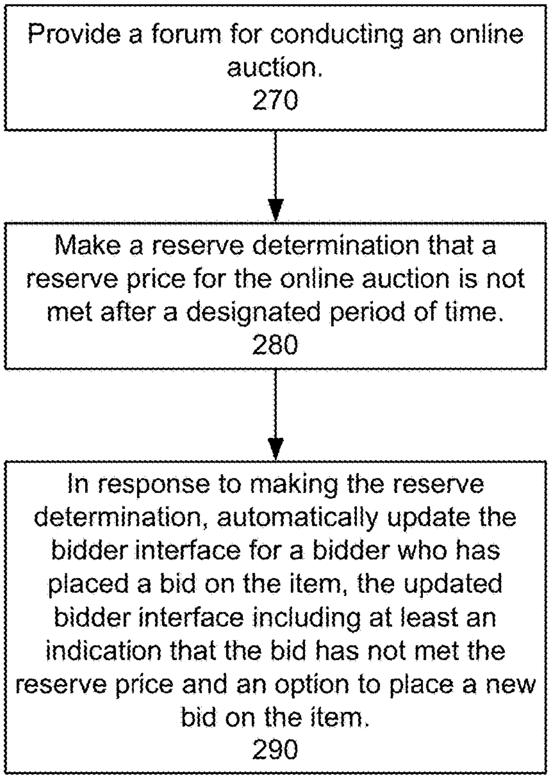
FIG. 2B illustrates an implementation of dynamic restructuring when a reserve price is not met.

FIG. 2B illustrates an implementation of dynamic restructuring when a reserve price is not met. A method such as described by FIG. 2B can be implemented using, for example, a system 100 such as described by FIG. 1. Accordingly, reference may be made to elements of FIG. 1 for purpose of illustrating suitable components for performing a step or sub step being described.

With reference to FIG. 2B, an auction may be initiated at an auction forum, under rules where the auction is extended from the default finish time when a bid is received. Thus, the auction may be initiated (270) so that auction activity occurs (e.g., bids are received). Prior to the finishing period, the reserve price not met sub-system 150 can be used to determine whether the reserve price for the auction is not met (280). If it is not met, the reserve price not met sub-system 150 can automatically update the bidder interface for an active bidder to include at least an indication that the bid has not met the reserve price. The updated interface can also include an option to place a new bid on the item (290).

EXAMPLES

Figure 3A:
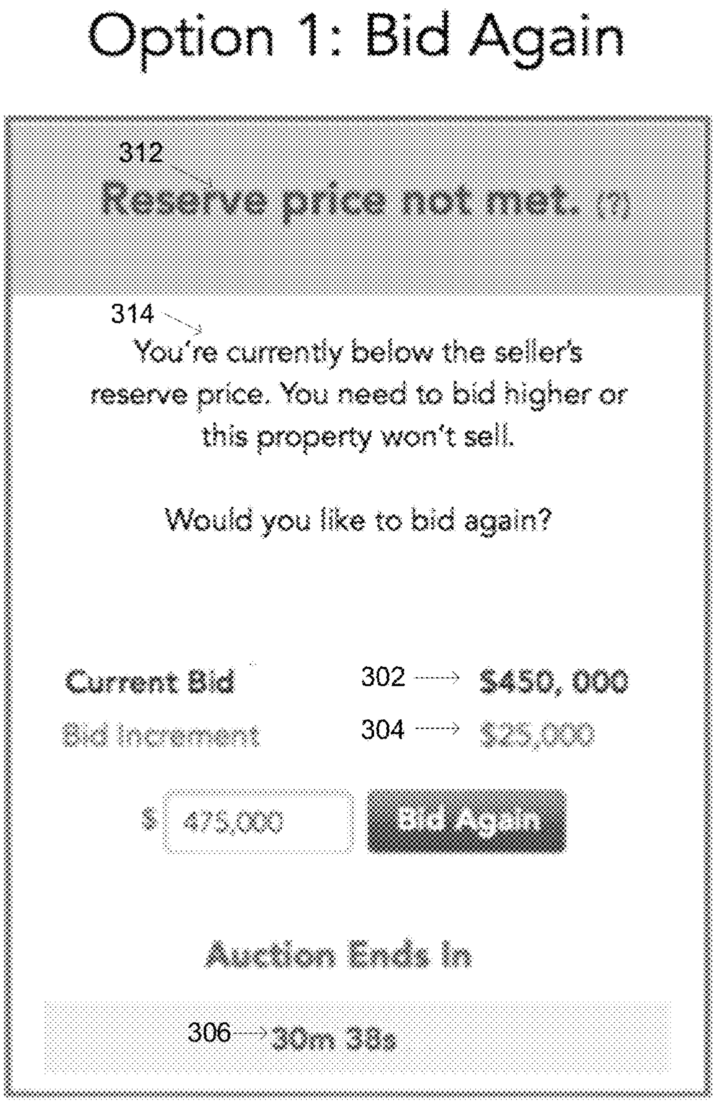
FIG. 3A illustrates an example bidder interface update in accordance with one aspect.
Figure 3B:
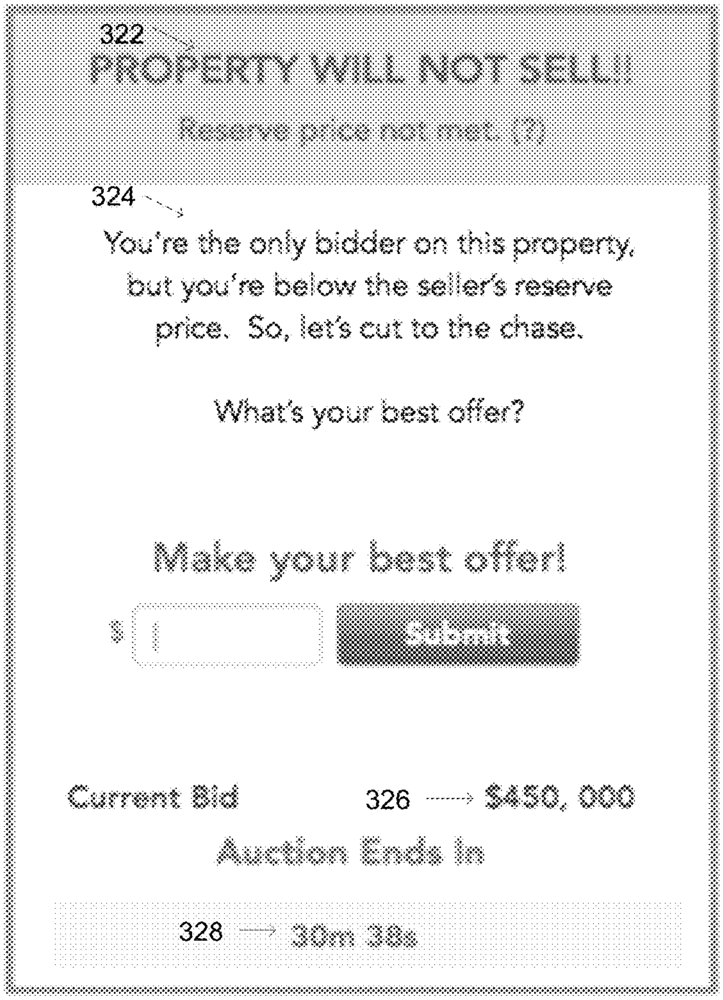
FIG. 3B illustrates an example bidder interface update in accordance with another aspect.
Figure 3C:
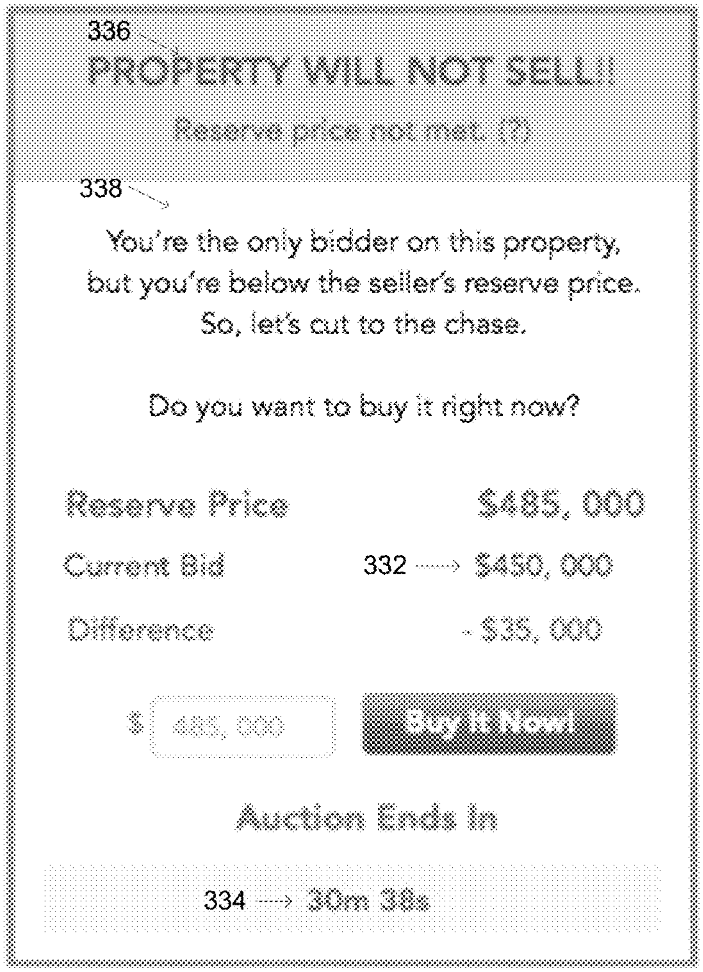
FIG. 3C illustrates an example bidder interface update in accordance with another aspect.

FIG. 3A through FIG. 3C illustrate examples of RNM ("RNM") interfaces which can be generated by an online auction forum, according to one or more embodiments.

Interfaces such as shown by examples of FIG. 3A through FIG. 3C can be displayed as a mechanism to entice activity from an online when bidders and/or bidding activity is sparse. Moreover, interfaces such as shown by examples of FIG. 3A through FIG. 3C can be generated as part of, for example, a service message or notification provided through an online auction conducted through an online auction system 100. An online auction provided through the system 100 can be accessible to bidders and interested parties via a browser, or through a network-enabled application of a user device.

In an example of FIG. 3A, an RNM interface 310 includes a bid field 302 displaying the last bid, a bid increment field 304 indicating the minimum increment for the next bid, and a timer 306 indicating when the auction will and under the current scenario. The RNM interface 310 can also include a message header 312 and a message body 314 which include content for enticing a viewer or recipient of the RNM interface 310 to bid again. In an example of FIG. 3A, the RNM interface 310 can be generated for the last or current bidder of the auction. The message body 314 can state that the reserve price has not been met, so that the bidder (e.g., only bidder, last bidder, etc.) knows that he or she will need to bid again in order to meet the reserve.

In an example of FIG. 3B, an RNM interface 320 includes a message header 322, a message body 324, a current bid field 326, and a timer 328. But the RNM interface 320 illuminates the bid increment. The message header 322 can display an alert indicating a likely auction status, and the message body 324 can package the bid submission field as the bidder's best offer.

In an example of FIG. 3C, an RNM interface 330 includes a current bid field 332, a timer 334, a message header 336 and a message body 338. The message header 336 and message body 338 can each display messages indicating the alert and likely auction status. Additionally, in an example of FIG. 3C, the content of RNM interface 330 can display the reserve price. Optionally, the RNM interface 330 can calculate the difference between the current price and the reserve price, and further provide that price as a suggested next bid in order for the bidder to win the auction.

According to variations of FIG. 3A through FIG. 3C, RNM interfaces 310, 320, 330 are generated by RNM logic 120 as a message or notification. For example, each of the RNM interfaces 310, 320, 330 can be generated as a pop-up, a content item for a webpage, an in-application message, or an overlay. The particular RNM interface in use can be displayed for different classes of interest parties, such as watchers (who have yet to bid), bidders, all bidders who submitted bids within a given time period or whom provided bids above a threshold (e.g., less than a threshold).

For a given auction, the interested parties can include viewers of the auction who are registered, users who have placed bids, or a most recent set of bidders. Many times, there may be only one bidder, and that single bidder may receive the RNM interface 310, 320, 330.

According to some examples, RNM logic 120 selects a common RNM interface for all auctions which are conducted through system 100. In variations, RNM logic 120 can select or structures the RNM interface 310, 320, 330 based on characteristics of the bidder, characteristics of the asset being auctioned, and/or seller characteristics or preferences. For example, if the reserve price exceeds a threshold, the selected RNM interface may generate a more aggressive message in the message body in order to entice another bid.

According to some implementations, a determination of when to display a given RNM interface can be set by programmatic triggers. In one implementation, a programmatic trigger can generate one of the RNM interfaces 310, 320, 330 based on an occurrence of a set of thresholds or conditions. The set of thresholds or conditions can be predetermined or selected as being indicative of a likely outcome where the reserve price is not met. By way of example, a trigger to initiate RNM interface 310, 320, 330 can be set by (i) the reserve price of the auction not having been met, and (ii) any one or more of the following conditions: (a) the number of bidders in an auction being less than a threshold number (e.g., when there is only one bidder); (ii) the number of bidders who have made bids in a recent portion of the auction being less than a threshold; (iii) a time condition, such as the amount of time remaining in the auction; and/or (iv) a parametric determination of bidding activity being less than a threshold. Still further, the RNM interface 310, 320, 330 can be triggered for display based on a likelihood determination that the reserve price of the auction will be met, given a difference between a current bid price and the reserve price, as well as the time remaining in the auction.

In some variations, RNM logic 120 can select one of the RNM interfaces 310, 320, 330 for each interested participant of a given auction. Thus, different RNM interfaces can be displayed for different types of bidders.

Figures 4A, 4B, 4C:
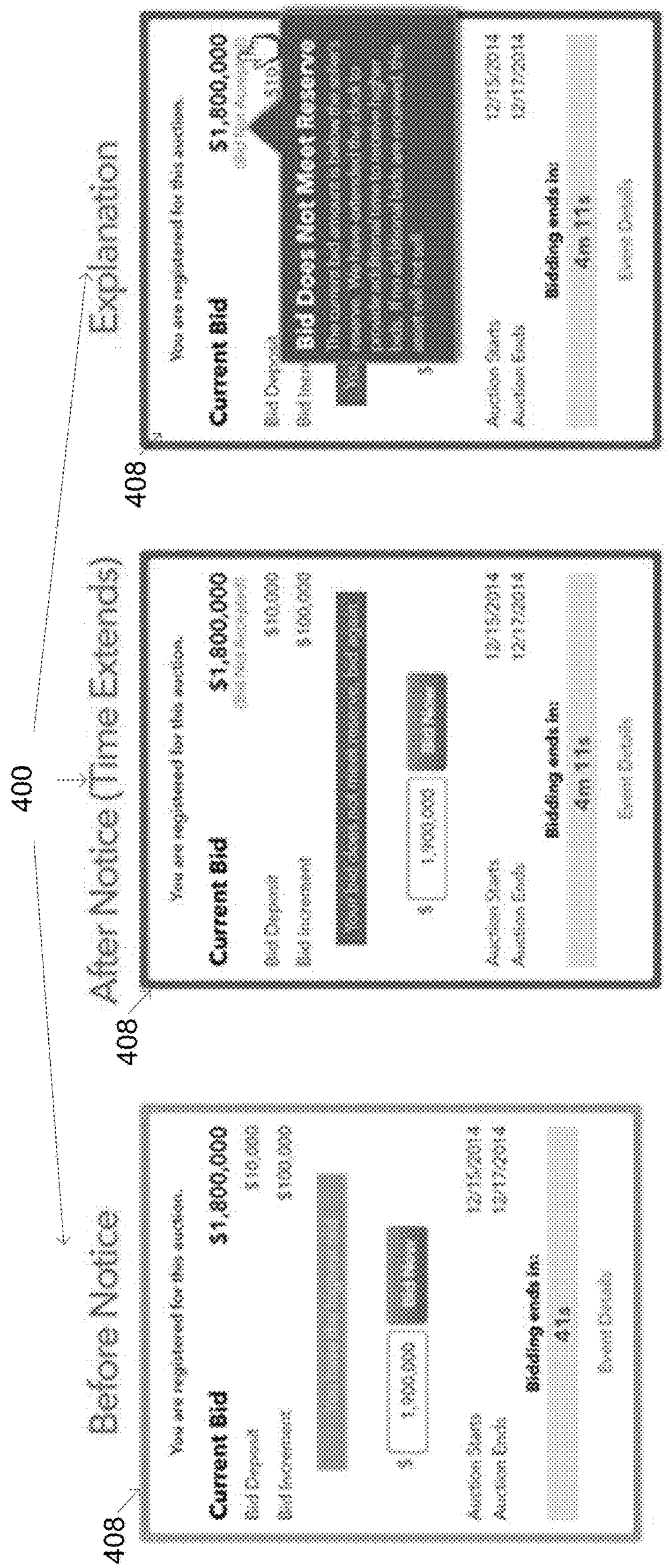
FIG. 4A illustrates an example bidder interface in accordance with some aspects.
FIG. 4B illustrates an example bidder interface in accordance with some aspects.
FIG. 4C illustrates an example bidder interface in accordance with some aspects.

FIG. 4A through FIG. 4C illustrate alternative examples of RNM ("RNM") interfaces in combination with features such as time extension, according to one or more examples. In examples of FIG. 4A through 4C, an RNM interface 400 is provided in multiple states which reflect a timing condition of the corresponding auction. In FIG. 4A, the RNM interface 400 reflects a state in which a timing threshold (e.g., amount of auction time remaining) has not yet been met. The RNM interface 400 can include the current bid, the bid increment, the minimum bid, a timer and message 408, which provides information that is state-dependent. For example, before the timing threshold is reached (e.g., 1 or 5 minutes before auction end), the message body 408 can reflect that the bidder is the highest bidder.

In FIG. 4B, the RNM interface 400 can be altered to reflect a timing condition, such as the expiration of the original time allotted for the auction and/or the beginning of the new time period (extended time). In this state, the message 408 can change to reflect for example, the fact that the reserve price has not been met. Thus, in FIG. 4B, the RNM interface 400 reflects the reserve price not having been met, and added time to enable the bidder to decide if he or she is willing to raise the price. In FIG. 4C, an explanation of the RNM interface 400 may be provided.

In some variations, a feature may be provided to enable the bidder to request the seller to reveal the reserve price. For example, the RNM interface 400 can include a feature when the time extension occurs which enables the bidder to send a message or notification to the seller. In variations enable the bidder to make a best offer as a counter to the reserve price.

Computer System

Figure 5:
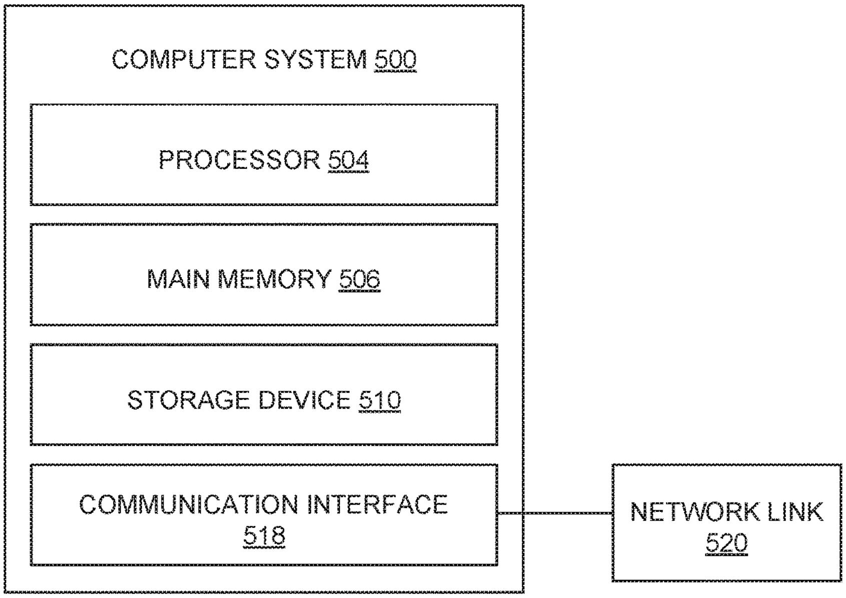
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using one or more servers such as described by FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 (wireless or wireline). The communication interface 518 may communicate with bidders and auction participants using, for example, the Internet.

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer-implemented method for providing a dynamically-updated bidder interface for an online auction, the method being implemented by a network system and comprising:

providing, on a computing device of a bidder of the online auction, a bidder interface that enables bidding on an item being auctioned when the online auction is in progress, wherein the bidder interface allows entry of a bid based on a bid increment having a default value;

determining to alter the bid increment of the online auction based at least in part on: (i) a reserve price for the online auction not being met, and (ii) a time remaining for the online auction;

in response to determining to alter the bid increment, automatically updating the bidder interface to include an indication that the bid has not met the reserve price and an updated bid increment based on a difference between a current highest bid for the online auction and the reserve price of the online auction;

in response to determining to alter the bid increment, extending an ending time for the online auction; and in response to extending the online auction, enabling, via the bidder interface, the bidder to send a message to a seller of the item of the online auction.

2. The computer-implemented method of claim 1, wherein determining to alter the bid increment of the online auction is further based on a determination that the bidder is the only bidder who has placed a bid on the item.

3. The computer-implemented method of claim 1, wherein updating the bidder interface for the bidder includes selecting the bidder interface from a plurality of bidder interfaces based on auction data and bidder data.

4. The computer-implemented method of claim 3, wherein the seller of the item selects the bidder interface.

5. The computer-implemented method of claim 1, wherein the current highest bid plus the updated bid increment meets or exceeds the reserve price.

6. A non-transitory computer-readable medium that stores instructions, executable by one or more processors of a network system, to cause the network system to perform operations that comprise:

providing, on a computing device of a bidder of an online auction, a bidder interface that enables bidding on an item being auctioned when the online auction is in progress, wherein the bidder interface allows entry of a bid based on a bid increment having a default value;

determining to alter the bid increment of the online auction based at least in part on: (i) a reserve price for the online auction not being met, and (ii) a time remaining for the online auction;

in response to determining to alter the bid increment, automatically updating the bidder interface to include an indication that the bid has not met the reserve price and an updated bid increment based on a difference between a current highest bid for the online auction and the reserve price of the online auction;

in response to determining to alter the bid increment, extending an ending time for the online auction; and enabling, via the bidder interface, the bidder to send a message to a seller of the item of the online auction in response to extending the online auction.

7. The non-transitory computer-readable medium of claim 6, wherein determining to alter the bid increment of the online auction is further based on a determination that the bidder is the only bidder who has placed a bid on the item.

8. The non-transitory computer-readable medium of claim 6, wherein updating the bidder interface for the bidder includes selecting the bidder interface from a plurality of bidder interfaces based on auction data and bidder data.

9. The non-transitory computer-readable medium of claim 8, wherein the seller of the item selects the bidder interface.

10. The non-transitory computer-readable medium of claim 6, wherein the current highest bid plus the updated bid increment meets or exceeds the reserve price.

* * * * *